No. 794,696. Patented July 11, 1905.

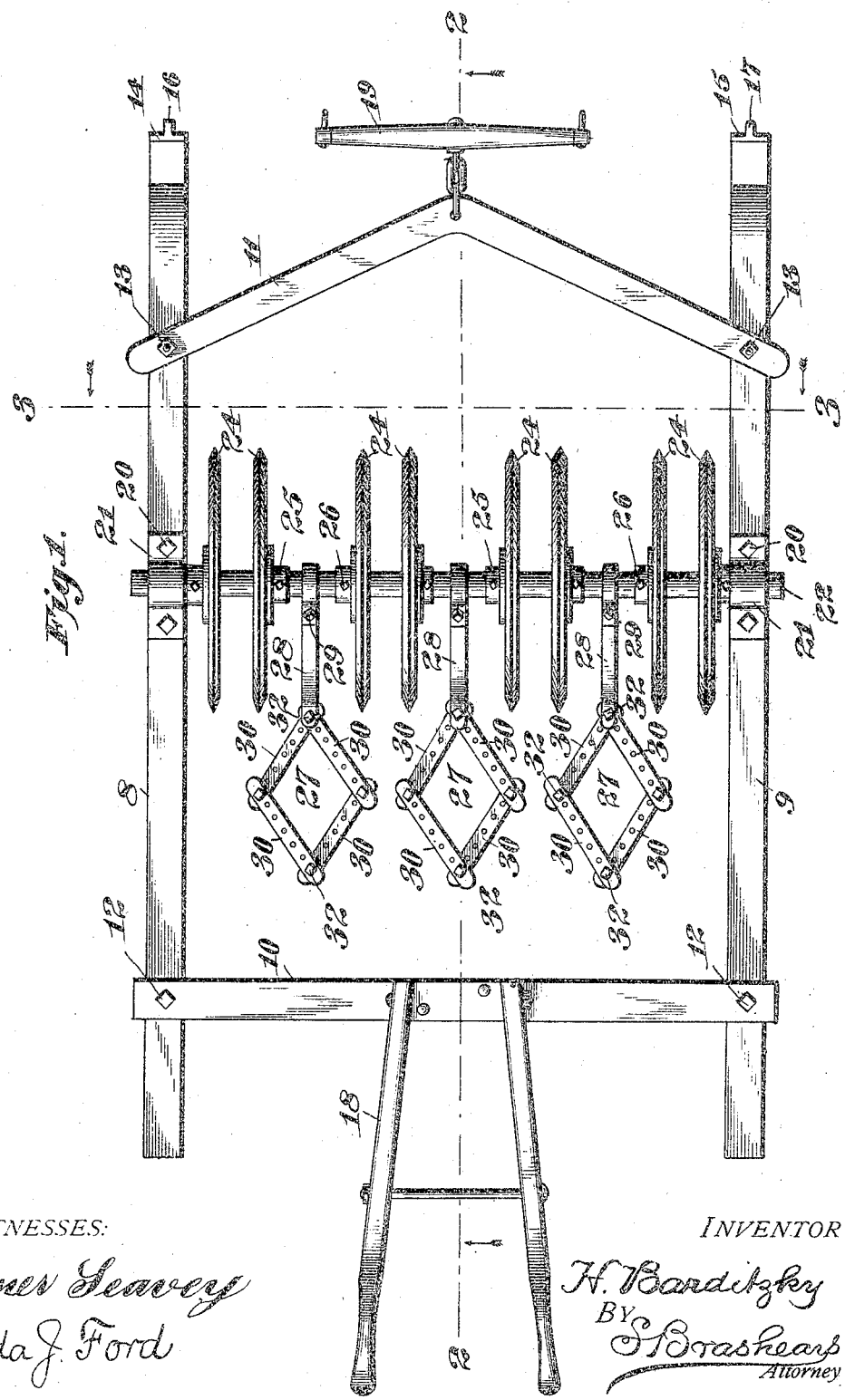

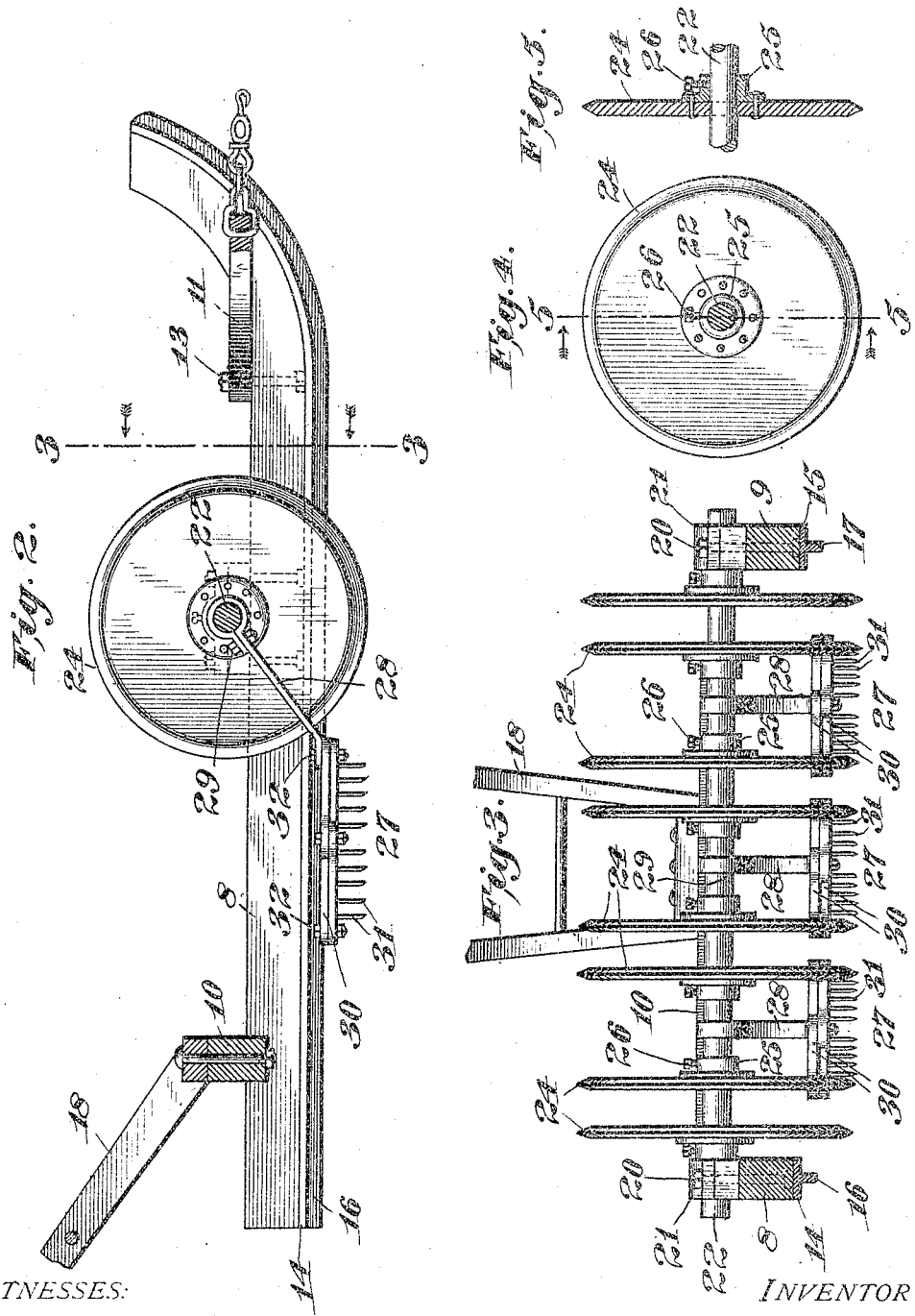

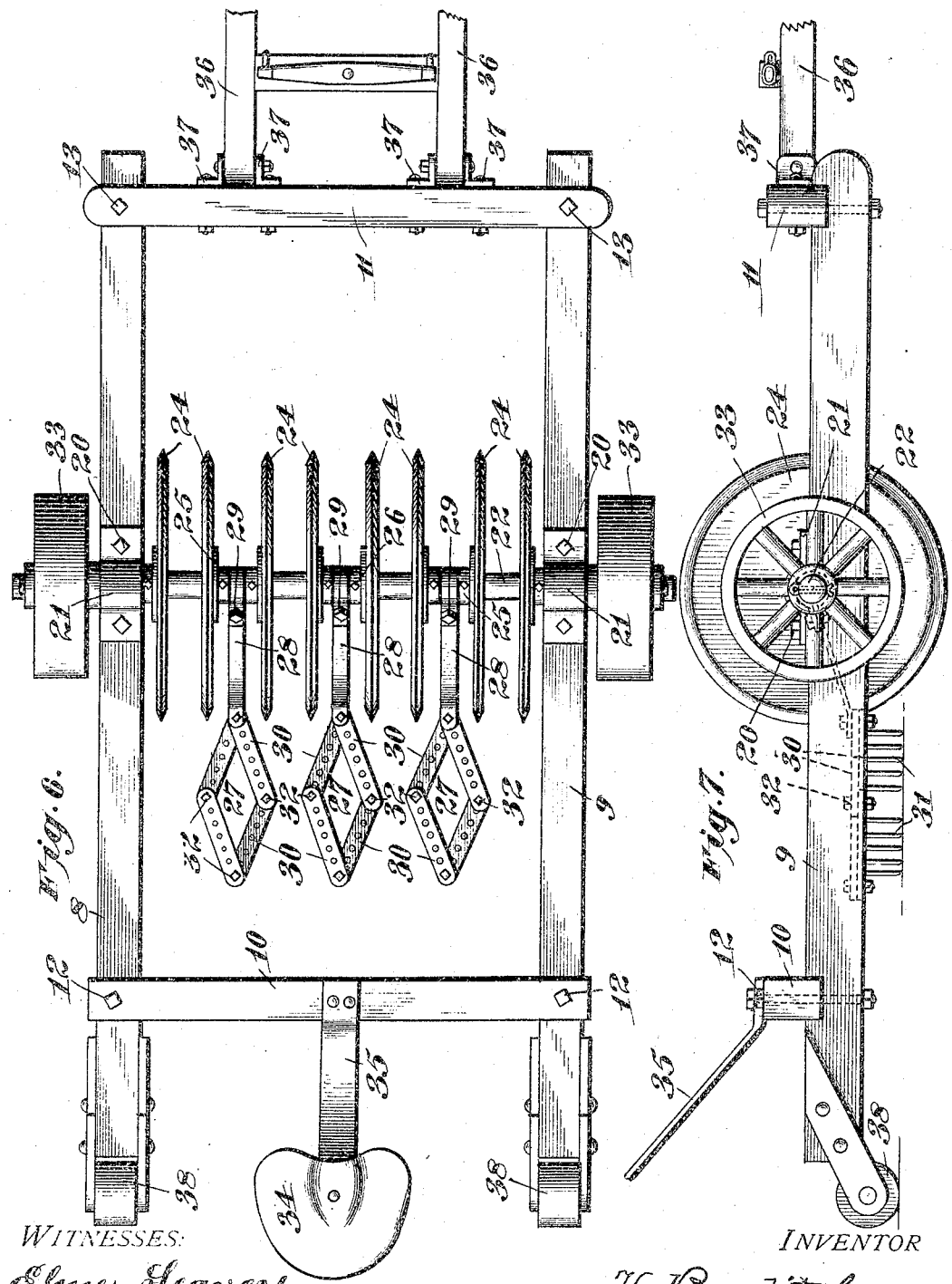

UNITED STATES PATENT OFFICE.

HERMAN BARDITZKY, OF MEMPHIS, TENNESSEE.

COTTON-CULTIVATOR.

SPECIFICATION forming part of Letters Patent No. 794,696, dated July 11, 1905.

Application filed August 5, 1904. Serial No. 219,639.

*To all whom it may concern:*

Be it known that I, HERMAN BARDITZKY, a citizen of the United States, residing at Memphis, in the county of Shelby and State of Tennessee, have invented certain new and useful Improvements in Cotton-Cultivators, of which the following is a specification.

This invention relates to the cultivation of growing plants, and particularly to the cultivation of growing cotton-plants, and has for its object to furnish an implement for this purpose which will clearly outline rows of any desired width, cutting into the earth at each side thereof and at the same time rake or harrow the earth between and close up to the edges of the rows without reference to the width of the rows, the cutting and marking of the rows being accomplished by means of circular disks adjustable to cut out the width of row desired and the rakes or harrows being also adjustable to correspond with the adjustment of the disks.

With this object in view my invention consists in the improved construction, arrangement, and combination of the combined disk and harrow cultivator hereinafter fully described and afterward specifically claimed.

In order to enable others skilled in the art to which my invention most nearly appertains, I will now proceed to fully describe its construction and operation in connection with the accompanying drawings, forming part hereof, in which drawings—

Figure 1 is a plan view of a cultivator constructed according to my invention, the frame being mounted upon runners forming a sled and provided with plow-handles, the operator in this instance walking behind the implement. Fig. 2 is a longitudinal vertical section through the same on the plane indicated by the broken line 2 2 of Fig. 1 looking toward the left-hand side, as indicated by the arrows. Fig. 3 is a transverse vertical section on the plane indicated by the broken line 3 3 of Figs. 1 and 2 looking toward the rear, as indicated by the arrows. Fig. 4 is a sectional detail view through the shaft, showing one of the disks in elevation. Fig. 5 is a sectional detail view on the plane indicated by the broken line 5 5 of Fig. 4. Fig. 6 is a plan view similar to Fig. 1, showing the implement with the frame mounted on wheels and provided with a seat upon which the operator may ride. Fig. 7 is a view in side elevation of the construction shown in Fig. 6 looking toward the left-hand side of the implement, the seat being broken away.

Like reference characters mark the same parts wherever they occur in more than one of the figures of the drawings.

Referring specifically to the drawings, in the construction illustrated in Figs. 1 to 5, inclusive, 8 and 9 indicate, respectively, the left and right hand side pieces of the main frame of the implement, which are of any suitable size and material and are connected by a rear cross-beam 10 and a front cross-bar 11, said beam and bar being suitably secured to the side pieces—as, for instance, by means of bolts 12 and 13. The side pieces 8 and 9 are provided on their under surfaces with shoes 14 and 15, having longitudinal keels or flanges 16 and 17, as most clearly shown in Fig. 3.

The rear cross-beam 10 serves as a point of attachment and support for a pair of ordinary plow-handles 18, and the front cross-bar 11 (which is preferably of metal and of expanded V shape, as shown in Fig. 1) serves as a point of attachment for a swingletree, as at 19, (or it may be a doubletree, shafts, poles, or any substitute therefor,) for the purpose of attaching one or more draft-animals.

The side pieces 8 and 9 are curved upward at their front end, as are also their shoes, so that the whole structure forms a sled, the side pieces thus forming runners which travel between the rows, while the keels or flanges 16 and 17 sink into the earth and keep the implement in a straight path, thus insuring great regularity in the cultivation of the field.

Suitably secured upon the top of the side pieces 8 and 9 at about their mid-length by any approved means, such as bolts 20, are bearings 21, comprising blocks and caps, in which is journaled a transverse shaft 22, upon which are adjustably secured any desired number of pairs 23 of cutting-disks 24. Each of these disks is provided with one plane face and opposite thereto with a hub 25, through which is threaded a set-bolt 26, bearing upon the shaft 22 and serving to hold the disk firmly in any position on the shaft to which it may be adjusted. These pairs 23 of disks in the operation of the device straddle the rows, and the plane faces of each pair face each other.

27 27, &c., indicate what I term "harrow-rakes," and which for brevity I shall in this description denominate "rakes," of which there are provided in each implement one less than the number of pairs 23 of cutting-disks 24 and which are attached to the shaft 22 between adjacent pairs of disks by means of downwardly and rearwardly extending metal straps or bars 28, formed at their forward ends into eyes surrounding the shaft and secured by bolts 29.

The rakes 27 for the purposes of my invention may be made adjustable in width by any suitable means; but an approved construction is shown in which each rake is formed of four side bars 30, bored at suitable intervals to receive rake-teeth 31 and at their corners to receive bolts 32 to adjustably secure the bars to each other, the bolt 32 of each frame (at the front corner) also serving to secure the rake to its drawing-bar 28, as shown in Fig. 2. By loosening the bolts 32 and moving the bars on them as pivots the width of the rakes can be accurately adjusted to conform to the adjustment of the disks 24 on shaft 22.

In the construction shown in Figs. 6 and 7 the device is ridden by the operator after the manner of a sulky-plow, and for this purpose the shaft 22 is extended laterally beyond the side pieces 8 and 9, and wheels 33 are attached thereon, which support the whole structure. A seat 34 for the operator is mounted on a spring-bar 35, secured to the rear cross-beam 10, and shafts 36 are attached by suitable thill-couplings 37 to the front cross-bar 11, which is shown straight instead of V-shaped, as before described. The shoes of side pieces 8 and 9 are dispensed with, and, if desired, small guiding and supporting rollers 38 may be attached to the rear ends of the side pieces, as shown.

For operation the implement is first adjusted with the disks at distance apart of the width of the row of plants it is desired to leave and the rakes to the width of the spaces left between the rows. With the pairs of disks each straddling a row the forward movement causes the disks to make clear cuts on the sides of the rows, and the rakes following the disks clean out all chips, rubbish, stray plants, and trash between the rows, the cuts made by the disks preventing the rakes from in any way disturbing the rows and leaving them clean, clear cut, and straight, and of any desired width. Any roots projecting from the rows or from the intermediate spaces toward the rows across the lines of travel of the disks are severed, so that they will not be dragged by the rakes across the cuts, thus preventing any part of the rows from being disturbed and leaving its sides regular instead of ragged and irregular, as might be the case if the rakes were dragged between the rows without using the disks. By reason of the adjustability of the disks of each pair the width of row may be accurately determined, and by the adjustability of the width of the rakes to correspond with the adjustment of the disks the spaces between the rows are completely raked, the arrangement described permitting of this result without removing and replacing one set of rakes with others of different width, which has been heretofore required where disks have been followed by cultivator-blades or the like, thus economizing in the number of rakes required and in the time necessary to prepare the implement for operation.

While I have specifically described the construction and operation of the various parts, I desire it to be understood that I do not confine myself to such exact construction, as it will be readily obvious to the skilled mechanic that slight changes therein or variations therefrom might be made without departing from the spirit and scope of the invention.

Having thus fully described my invention, what I claim as new, and desire to secure by Letters Patent of the United States, is—

1. In an implement of the character described, the combination of a frame, a transverse shaft journaled therein, disks arranged in pairs thereon, means for adjusting the disks of each pair to and from each other, and rakes attached to the shaft between the disks of each pair and adjustable in width to conform to the distance apart to which the disks of each pair have been adjusted, substantially as described.

2. In an implement of the character described, the combination of a suitable frame, a transverse shaft journaled therein, disks arranged in pairs upon the shaft, the disks of each pair being adjustable toward and from each other, straps embracing the shaft between adjacent pairs of disks and extending rearwardly therefrom, rakes comprising jointed, laterally-expansible frames, and bolts for securing the frames in their adjusted positions, one of said adjusting-bolts serving also to secure each strap to its rake, substantially as described.

3. An implement of the character described, comprising longitudinal side pieces, metal shoes thereon provided with longitudinal keel-flanges, a transverse shaft journaled in the side pieces, disks arranged on said shaft in pairs and adjustable thereon, straps attached to the shaft between the adjacent pairs of disks and extending rearward, rakes secured to said straps in the rear of the space between adjacent pairs of disks, means for adjusting the width of the rakes to suit the adjustment of the pairs of disks, a front cross-bar connecting the side pieces and serving as a point of connection for draft devices, and a rear cross-beam connecting the side pieces and serving as a support for a seat or plow-handle, substantially as described.

In testimony whereof I affix my signature in presence of two witnesses.

HERMAN BARDITZKY.

Witnesses:
D. R. WALKER,
THOMAS COWART.